(12) United States Patent
Cogliano

(10) Patent No.: US 6,607,388 B2
(45) Date of Patent: *Aug. 19, 2003

(54) SEQUENCE LEARNING TOY

(75) Inventor: Mary Ann Cogliano, Loomis, CA (US)

(73) Assignee: Leapfrog Enterprises, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/126,857

(22) Filed: Apr. 18, 2002

(65) Prior Publication Data

US 2002/0110790 A1 Aug. 15, 2002

Related U.S. Application Data

(63) Continuation of application No. 09/881,801, filed on Jun. 18, 2001, now Pat. No. 6,409,511, which is a continuation of application No. 09/592,581, filed on Jun. 12, 2000, now Pat. No. 6,247,934, which is a continuation of application No. 09/247,622, filed on Feb. 10, 1999, now Pat. No. 6,074,212.
(60) Provisional application No. 60/075,115, filed on Feb. 11, 1998.

(51) Int. Cl.[7] .................................................. G09B 1/00
(52) U.S. Cl. ...................... 434/159; 434/160; 434/327; 434/335; 446/297; 446/369
(58) Field of Search ................................ 434/159, 169, 434/160, 335, 327, 337, 365; 446/297–303, 313, 368, 369, 143, 9, 7, 376–384; 273/429

(56) References Cited

U.S. PATENT DOCUMENTS 1,521,573 A * 12/1924 Myers
2,728,168 A * 12/1955 Gier
2,738,617 A * 3/1956 Capehart
3,768,179 A 10/1973 Woodford et al.
3,977,292 A 8/1976 Favilli et al.
4,114,292 A 9/1978 Smith
4,204,360 A 5/1980 Bentall
4,280,809 A 7/1981 Greenberg et al.

(List continued on next page.)

FOREIGN PATENT DOCUMENTS

JP 51-111133 10/1976

OTHER PUBLICATIONS

Alphabet Block Train, Popular Science Magazine, vol. 149, No. 1946, p. 151.
Real Talkin' Bubba, No. 1787, Tyco Toys Catalog, 1997, p. 117.

(List continued on next page.)

Primary Examiner—Derris H. Banks
Assistant Examiner—Bena B. Miller
(74) Attorney, Agent, or Firm—Townsend and Townsend and Crew LLP

(57) ABSTRACT

An educational toy for teaching a child a sequence of letters, numbers, colors or other sequences. The toy would be provided with a plurality of segmented body portions, each of the body portions associated with a single indicia. A switch is provided on each of the segmented body portions. When this switch is depressed, an audio output associated with the indicia would be produced. After the child has memorized a series of indicia to produce a learned sequence, a switch associated with a segmented body portion having demarcation indicia would be depressed, allowing the entire sequence to be vocalized in order.

50 Claims, 3 Drawing Sheets

U.S. PATENT DOCUMENTS

| | | | |
|---|---|---|---|
| 4,295,832 A | | 10/1981 | Karell |
| 4,358,278 A | | 11/1982 | Goldfarb |
| 4,509,920 A | | 4/1985 | Kaufmann |
| 4,516,950 A | | 5/1985 | Berman et al. |
| 4,521,205 A | | 6/1985 | Spector |
| 4,609,356 A | | 9/1986 | Gilden et al. |
| 4,651,613 A | | 3/1987 | Harrison |
| 4,681,548 A | | 7/1987 | Lemelson |
| 4,846,692 A | | 7/1989 | Delcambre |
| 4,869,701 A | * | 9/1989 | Kawai et al. |
| 4,936,780 A | | 6/1990 | Cogliano |
| 4,968,255 A | | 11/1990 | Lee et al. |
| 5,092,777 A | | 3/1992 | Crowe |
| 5,114,376 A | | 5/1992 | Copley et al. |
| 5,188,533 A | | 2/1993 | Wood |
| 5,349,129 A | | 9/1994 | Wisniewski et al. |
| 5,413,355 A | | 5/1995 | Gonzalez |
| 5,478,240 A | | 12/1995 | Cogliano |
| 5,478,268 A | | 12/1995 | Au |
| 5,511,980 A | | 4/1996 | Wood |
| 5,554,062 A | | 9/1996 | Goldsen |
| D388,141 S | | 12/1997 | Nielsen |
| 5,833,465 A | | 11/1998 | Jarzewiak |
| 5,944,533 A | | 8/1999 | Wood |
| 5,997,304 A | | 12/1999 | Wood |
| 6,074,212 A | | 6/2000 | Cogliano |
| 6,247,934 B1 | | 6/2001 | Cogliano |

OTHER PUBLICATIONS

"Bull Frogg", The Ohio Art Company, Bryan, Ohio, 1998.

"Early Learning System Featuring Barney", Playthings, Feb. 1997, p. 114.

"Bananas in Pajamas", Toy Book, Feb. 1996, p. 132.

"Musical Mickey & Minnie", Mattel catalog 1992, p. 38.

"The Lion King" talking toy, Mattel catalog, 1995, p. 144.

Various talking toys described in The Toy Book, Feb. 1997, p. 260.

"Caterpillar teaches numbers", unknown catalog, LVC 1996.

"Alphabet Stencil", Alphapillar/Numberphillar, www.usmapstencil.com/alphanum.htm, downloaded Jul. 17, 2001, US trademark published Jan. 1, 1993, (Westlaw report).

Kitzman, Flora E., "Counterpillar", USPTO, trademark published Sep. 12, 1989 (Abandoned May 1990).

Jones, Mary, "Number caterpillar", USPTO registered trademark, Aug. 1980.

"Counting caterpillar", Small World Toys,USPTO registered trademark, Apr. 1994.

"123 Caterpillar", Calino (illustrator), Abbeville Press, 1997.

"Caterpillar ABC's", Small World Toys, USPTO trademark, Apr. 1994.

"ABC caterpillar", Intelligence Quest Software, division of Avalon Hill Game Company, USPTO registered trademark. Jul. 1985.

"Microsoft, Barney teaming up", Associated Press, Aug. 19, 1997, http://gabrielmedia.org/news/ms–barney.html, downloaded Jul. 23, 2001.

Beck, Rachel, "New Barney talks, but will parents buy it?", Associated Press, posted on features@ugusta Aug. 23, 1997, www.augustachronicle.com/stories/082497/fea_barney.html, downloaded Jul. 23, 2001.

"Growing Number Lines", chat room message posted Feb. 9, 1999, http://kinder.cmsd.bc.ca/kinder–1/1999/9902/0602.html, downloaded Jun. 26, 2001..

"ABC Caterpillar Book Educational", www.yellowelephant.com/abccatbook.html, downloaded Jun. 26, 2001.

"Alphabet Caterpillar Puzzles", Learning & Discovery, www.shopbecker.com, downloaded Jun. 27, 2001.

"Felt Puzzles:", Family Pastimes, pp. 1–2, www.familypastimes.com/puzzles/flet.html, downloaded Jun. 27, 2001.

"Number Caterpillar Eco Toy", stuffed toys, Childsake.com, http://store.yahoo.com/childsake/06506, downloaded Jun. 26, 2001.

Soft toys and Games, Toys & Games, www.fiestacrafts/co.uk/Toys_Games/body_toys_games.html, downloaded Jun. 26, 2001.

"Pre Academic Activities", Insects Preacademic, various learning toys, www.sbcss k12.ca.us/sbcss/specialeducation/ecthematic/insects/pacadem.htm, downloaded Jun. 27, 2001.

"Chunky Puzzle Caterpillar", Oxfam FairTrade Company, http://store.europe.yahoo.com/oxfam–uk/040231.html, downloaded Jun. 27, 2001.

"ABC08 Alphabet Caterpillar Puzzle, Upper Case", Resources for Reading, www.abcstuff.com/, search for ABC08, downloaded Jun. 27, 2001.

"Wooden Caterpillar Counting Puzzle", Insect Lore Europe, www.insectlore–europe.com/woodcatcounp.html, downloaded Jun. 29, 2001.

The Puzzle People, various toys for learning numbers, www.puzzlepeopleinc.com/counting.html, downloaded Jun. 29, 2001.

"Mr. Caterpillar Game", Insect Lore, www.insectlore.com/mrcatgam.html, downloaded Jun. 28, 2001.

Kiddicopia Books, various learning toys, www.kiddicopia.com/html/books.html, downloaded Jul. 16, 2001.

* cited by examiner

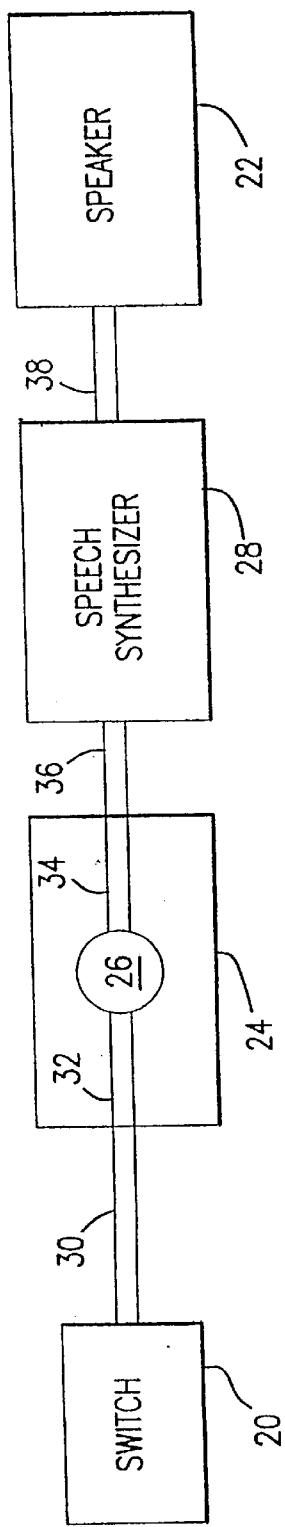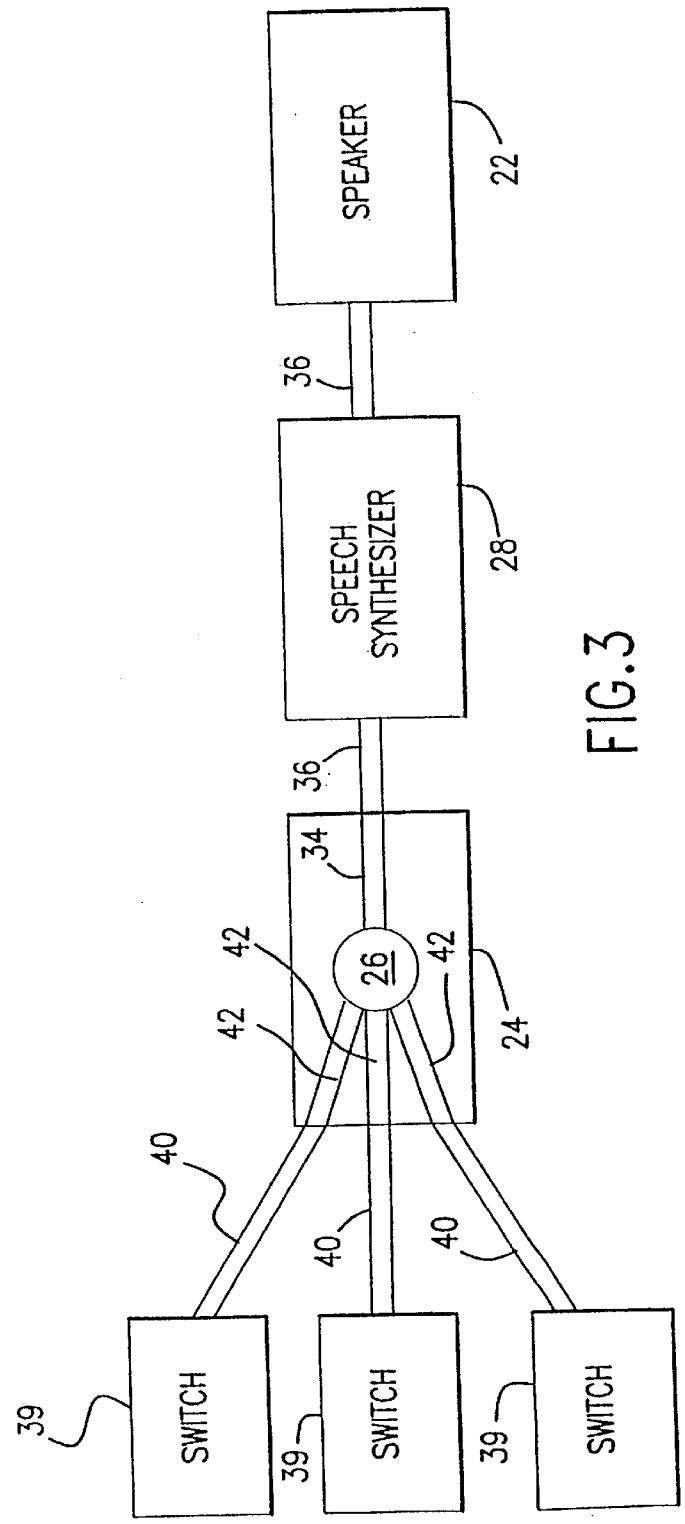

SEQUENCE LEARNING TOY

The instant application is a continuation application of U.S. patent application No. 09/881,801 filed Jun. 18, 2001, now U.S. Pat. No. 6,409,511 which is a continuation application of U.S. patent application Ser. No. 09/592,581, filed Jun. 12, 2000, now U.S. Pat. No. 6,247,934, which is a continuation application of U.S. patent application Ser. No. 09/247,622, filed Feb. 10, 1999, now U.S. Pat. No. 6,074,212 based upon provisional application Serial No. 60/075,115, filed Feb. 11, 1998. The foregoing patent applications are herein incorporated by reference in their entirety for all purposes.

BACKGROUND OF THE INVENTION

From time immemorial, the education of the children in a particular society has been paramount in the minds of the parents and the elders of the society. Do to the increasing complexity of our society, educators have long spent their time devising various methods and devices for better educating our children at an earlier and earlier age. This increasing complexity in our day and age is due in part to the development of new technologies, such as printed circuit boards, microprocessors and voice synthesizers used in almost every facet of our daily lives. Since virtually every educator believes that reading is the most important skill to be developed by a child, these educators have endeavored to utilize modern day technology to interest the child in reading as well as to develop the appropriate skills at a relatively early age.

One of the first toys utilized by pre-school children to enhance visual as well as manipulative skills is a set of blocks. These blocks have been embossed with various indicia used to interest and stimulate the child. Many of these blocks include a set of alphabet letters which children can use to familiarize themselves with the shape and formation of each letter. Alternatively, these blocks could be used to formulate rudimentary words. While these types of blocks have been utilized to stimulate the children's visual skills, these blocks would provide no benefit relating to the audio skills needed to develop a child's reading ability. While the child can recognize various letters utilized in these types of blocks, he or she various letters utilized in these types of blocks, he or she would have no clue as to the sound of the individual letters of the alphabet based solely upon utilizing this set of blocks.

U.S. Pat. No. 4,936,780, issued to Cogliano, addresses this problem by providing the child with one or more series of blocks having indicia on at least one side. A capacitive or pressure switch is used to active a voice synthesizer provided in the interior of the block. The synthesizer would be connected to a speaker to produce a sound corresponding to the indicia provided on the surface of the block. While it has been established that this block would aid in the ability of a child to associate the shape of one of the letters with its sound, this patent could not be utilized to assist the child in learning where in the alphabet a particular letter is to be placed.

U.S. Pat. No. 4,651,613, issued to Harrison, describes a musical block including a cube having six faces and an actuator associated with each of the faces. Based upon an applique provided on each of the faces, the sound or musical tune would be played once the associated actuator is engaged.

However, as was true with respect to the Cogliano patent, this musical block would not allow a child to learn a proper alphanumeric sequence. The problem of teaching a child a proper alphanumeric or color sequence has been addressed by U.S. Pat. Nos. 4,846,692, issued to Delcambre; U.S. Pat. No. 4,509,920, issued to Kaufmann; as well as an article appearing on page 151 of volume 149 of *Popular Science* magazine.

The patent to Kaufmann describes an educational toy for teaching alphanumeric sequences and is provided with a plurality of body members and an irregular, generally cylindrical configuration. Each of these body members 15–20 includes a device for cooperating with a guide means in a manner in which each of the body members rotates about an axis 13 of a support member in a first direction. These body parts are provided with buttons 33–37 having various indicia thereon. For example, each button could be assigned a separate number "1", "2", "3", "4" and "5" or particular letters, such as "A", "B", "C", "D" and "E". Therefore, if the child would properly construct the educational toy, the numbers or the letters would be in the proper sequence.

The patent to Delcambre is also directed to an educational children's toy for teaching proper numeric, alphabetic or color sequences. A toy stand is provided with a plurality of vertical shafts 15. Each of the vertical shafts has a number, color or letter associated therewith. A plurality of blocks is associated with the children's toy. If these blocks are not put into the vertical shafts 15 in the proper sequence, they will fall to the bottom of the toy. In this manner, a proper alphanumeric sequence can be learned.

The *Popular Science* article contains a number of blocks, each having indicia associated therewith. With the exception of the first block in any sequence, each of the blocks is provided with both a joint member as well as a receiving device. Each of the joints would fit into only one of the receiving devices. Therefore, once the blocks are properly attached to one another, an alphanumeric sequence can be learned.

Although the prior art does show various devices designed to teach a child different types of sequences, the prior art does not combine the teaching of a sequence with the sound associated to each element in the sequence.

SUMMARY OF THE INVENTION

The present invention is directed to an innovative educational toy designed to appeal to pre-school age children. A plush, stuffed, elongated insect in the character of a caterpillar, a centipede or any other long, contoured, segmented insect could be utilized. Additionally, the toy could take the form of any appropriate animal. Each segment of the animal body, or insect's body, is provided with indicia which would be related to other indicium provided on other portions of the body. A microprocessor as well as a voice synthesizer would be provided within the animal body or the insect's body. The voice synthesizer would produce various audible outputs responsive to the depression of various input switches provided or associated with each segment of the animal's or insect's body. Additionally, the insect's head or the animal's head and mouth would be designed to mechanically open and sing, or otherwise verbalize the audio response.

BRIEF DESCRIPTION OF THE DRAWINGS

In order that the invention may be readily carried into effect, it will now be described with reference to the accompanying drawings, wherein:

FIG. 2 is a circuit diagram used to produce a single sound;

FIG. 3 is a second circuit diagram used to produce a number of sounds; and

DETAILED DESCRIPTION OF THE DRAWINGS

Figure 1:
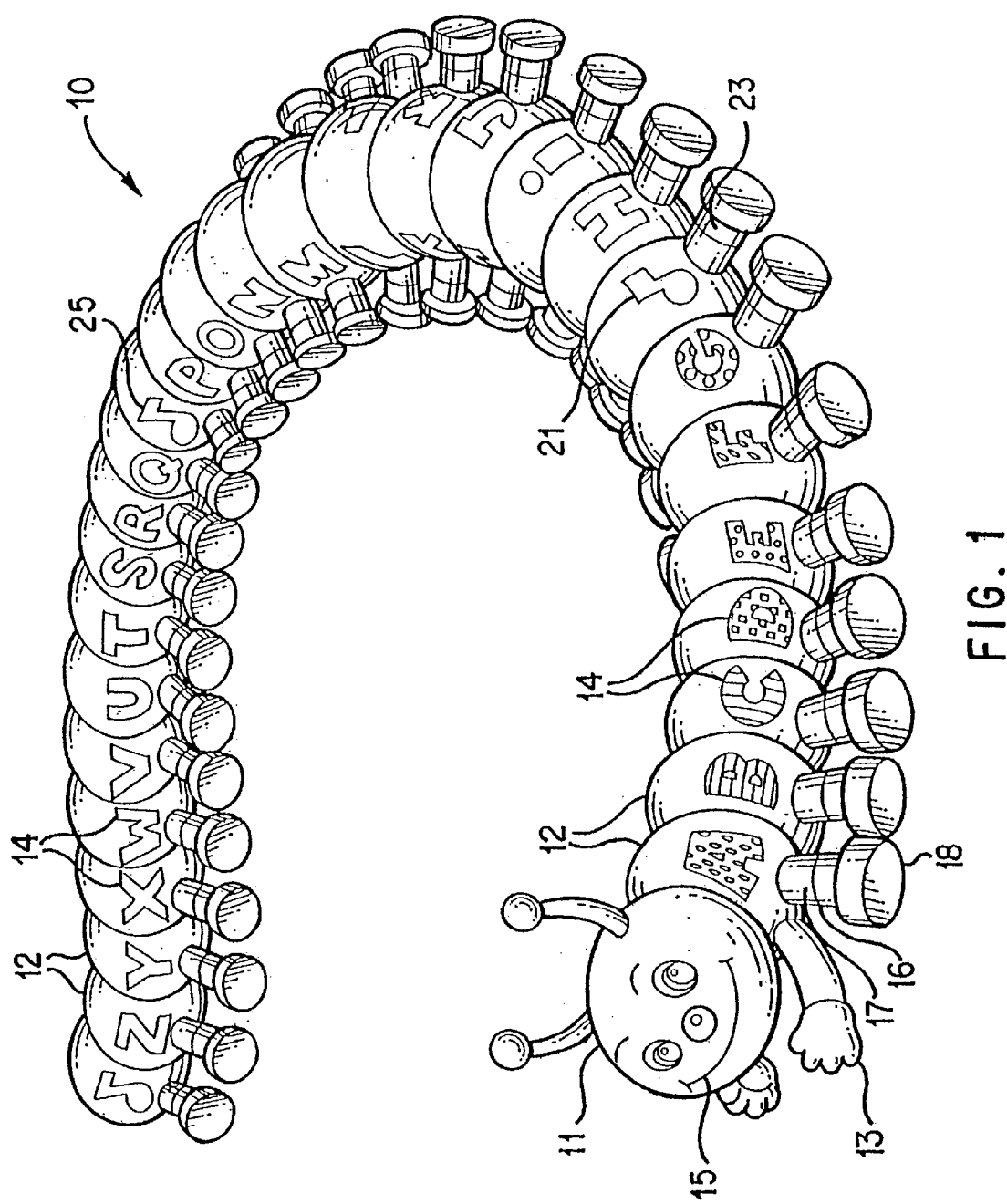
FIG. 1 is a perspective view of one embodiment of the present invention.
Figure 4:
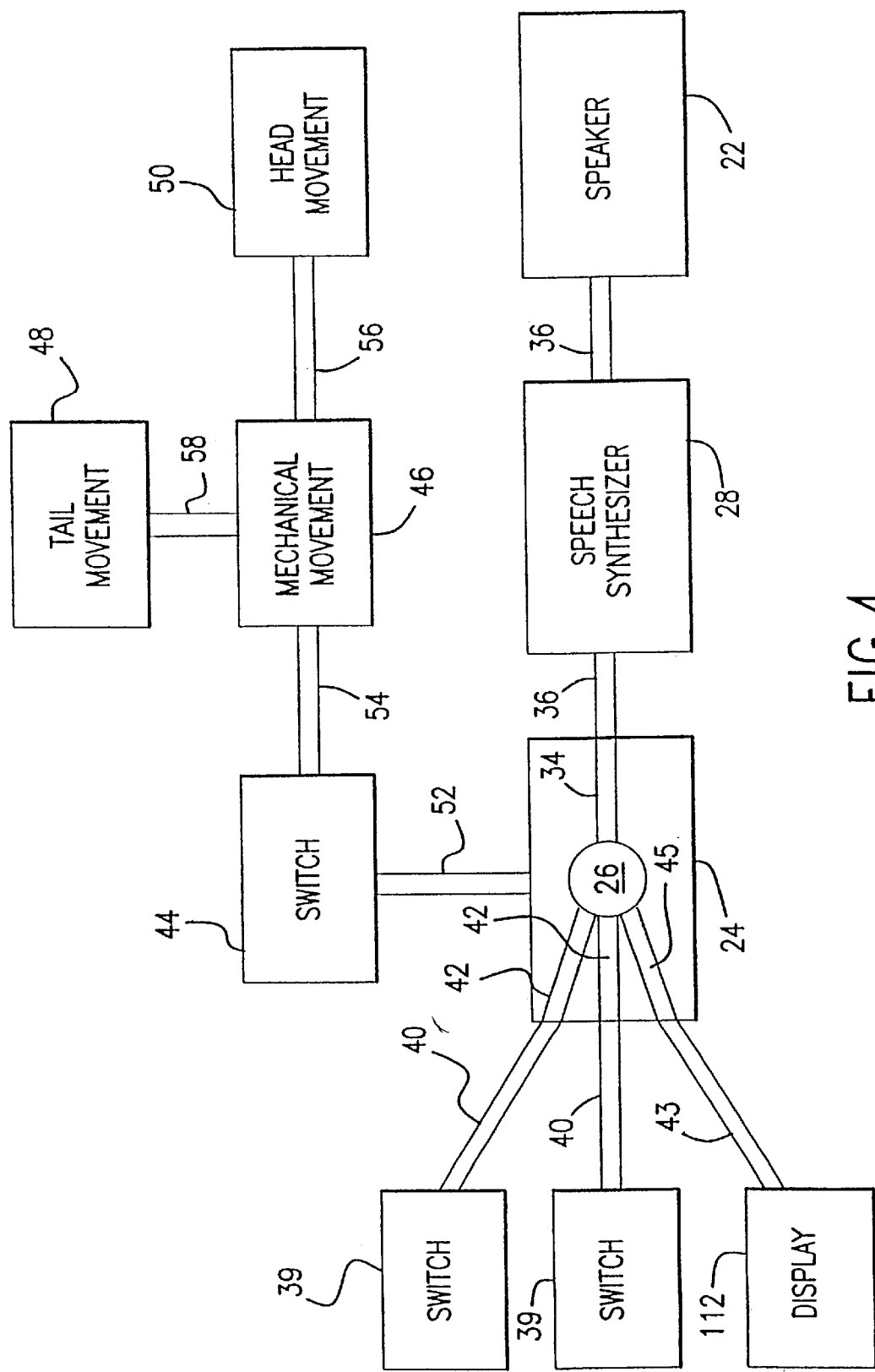
FIG. 4 is a third circuit diagram used to produce a sound and a movement of the toy.

As illustrated with respect to FIG. 1, the sequence learning toy 10 is in the form of a caterpillar having a plurality of segmented body portions 12. Each of these segmented body portions can be hemispherical or concave in shape or in any other manner pleasing to the child. Although the type of animal or insect can be virtually limitless, we will describe the present invention with respect to a caterpillar. Each of the segmented body portions would be constructed from a plush material, soft to the touch, and the interior of each of these segmented body portions would be equally plush. Additionally, the interior portion of each of the segmented body portions 12 can be filled with various pleasing aromas or textures, such as flax, lavender, chamomille and the like.

The outer body portion of the toy would include a plurality of switches 17. As illustrated in FIG. 1, each of the segmented body portions 12 is provided with a pair of pressure, capacitive or similar switches which are capable of being depressed by the child. Since FIG. 1 is illustrated as a caterpillar, the two switches 17 associated with each of the segmented body portions 12 would serve as the legs of the caterpillar. Each switch 17 is connected to the side of its respective body portion and would be pointed downward therefrom. Alternatively, each of the switches 17 can be connected to the bottom of each of the segmented body portions 12 and extend either in a horizontal or a vertical manner. As illustrated with respect to FIG. 1, each of the switches 17 is provided with a portion 16 directly affixed to the segmented body portion 12, as well as a portion 18 which is Connected to one end of the portion 16. Section 18 would either be depressed by the child or would be activated when the child touches this portion 18.

Each of the outer surfaces of the segmented body portions 12 would include at least one indicia 14 associated with each of the body portions. If the purpose of the toy is to teach the child the sequence of letters, each segmented portion would include one of the letters of the alphabet or a demarcation indicia 21 subdividing the letters into various groups. Each of the letters 14 could be applied to the surface of the indicia in any feasible manner. Additionally, each of the indicia could be slightly raised from the plush body of the caterpillar. As illustrated in FIG. 1, the segmented body is divided into four groupings, each grouping separated by demarcation indicia 21, such as a musical note or symbol. The caterpillar is also provided with a head 11 having a mouth 15. The alphabet would begin adjacent to the head 11 of the caterpillar and would proceed in the correct order until it reaches the tail portion of the caterpillar. The switches associated with each of the indicia would be operated either as a touch sensor or by physically depressing the switch. The interior of the caterpillar would include a microprocessor and a voice synthesizer and will be illustrated in great detail later. Therefore, when the child depresses one of the switches 17 associated with a particular indicia, such as the letter "A", the microprocessor, in conjunction with the voice synthesizer would produce the correct audio output. This audio output can be synchronized with the movement of the mechanical head 11 of the caterpillar and/or of the caterpillar's mouth. Additionally, each of the letters could be provided with an illumination device, such as a light-emitting diode (LED) which would be illuminated when the particular letter is depressed.

As previously indicated, the alphabet as shown in FIG. 1 is divided into four categories. Obviously, the number of categories can be changed based upon a particular learning sequence. Furthermore, each of the categories can exhibit a different outer color which could be illuminated using different LED's. At the end of each category, the demarcation indicia 21, such as a musical note, is displayed. Once a child learns the first group of letters, the child could proceed to depress the switch 23 associated with the indicia 21 and the caterpillar's mouth will mechanically open and sing the entire first group of the alphabet (ABCDEFG) that the child has just memorized.

The child, will next proceed to memorize the second group of letters (HIJKLMNOP), and when the second musical note 25 is depressed, the caterpillar will sing the entire sequence, beginning with the letter A and ending at the letter P. The child will resume this procedure until the entire alphabet is learned.

It can be envisioned that the indicia can take many forms, such as numbers, shapes or various colors.

FIGS. 2 and 3 illustrate various circuit diagrams which can be utilized in the operation of the present invention. The circuit of FIG. 2 includes a switch 20, a printed circuit board or similar device 24 containing a solid-state, non-erasable memory 26, such as a read-only memory (ROM), a voice synthesizer 28 and a speaker 22. Based upon this circuit, when the switch 20 is activated, a signal is transmitted along conductor 30 to the memory 26 of the printed circuit board 24 along a conductive tracing 32, or similar manner. This signal would be processed and a second signal would be transmitted along tracing 34 to conductor 36 which would thereby produce a digital sound in the voice synthesizer 28. This synthesizer is connected via a conductor 38 to the speaker 22 which would produce a sound representative of the indicia embodied on the surface of the segmented body portion. In this manner, when the switch 20 is depressed, the child can associate an audio output with a visual indicia. The printed circuit as well as the voice synthesizer could be included on a single circuit board which is provided in the interior of the caterpillar's body.

As illustrated with respect to FIG. 3, a plurality of separate touch-reactive or depression-type switches 39 can be utilized in this invention. In this situation, a plurality of conductive wires 40 is connected to the printed circuit board 24. These wires would in turn be connected to separate conductive tracings 42 provided oh the printed circuit board, each tracing connected to the memory 26. Consequently, once one of the switches is activated, the special sound coinciding with the indicia provided on the exterior surface of the segmented body to which the switch is attached would be produced.

Once a sequence or a subsequence has been properly spelled or completed, a switch 44 connected to the printed circuit 24 by a conductor 52 would enable various parts of the animal or insect to move utilizing a mechanical movement device 46 which would be enabled by the switch 44 through a conductor 54. This mechanical movement device 46 is connected, in the example of a caterpillar, to move the head through a head movement device 50 which could also include movement of the caterpillar's mouth. Furthermore, the tail of the insect or animal could also be moved using a tail movement device 48. The general mechanical movement device 46 is connected to the head movement device 50 by a conductor 46 and to the tail movement device 48 by a conductor 58. A display 112 is connected to the printed circuit board via a conductor 43. This display would indicate that the LED associated with each of the segmented body parts would be illuminated at the same time that the corresponding audio response would generated based upon the depression of the corresponding switch.

While one embodiment of the invention has been described in detail, it will be apparent to those skilled in the art that the enclosed embodiment may be modified. Therefore, the foregoing description is to be considered exemplative rather than limiting. As indicated hereinabove, the type or animal or insect utilized may take various forms.

What is claimed is:

1. A caterpillar shaped educational toy comprising:
   a caterpillar shaped body form of a series of body portions;
   a plurality of switches associated with said caterpillar shaped body, each of said switches forming a leg of the caterpillar shaped toy, each of said switches associated with a member of a set of indicia; and
   a voice synthesizer associated with said plurality of switches.

2. The educational toy of claim 1 wherein the educational toy is plush.

3. The educational toy of claim 1 wherein each of the body portions has a concave shape.

4. The educational toy of claim 1 wherein each of the switches is a pressure switch.

5. The educational toy of claim 1 wherein each of the switches is a first switch, and wherein the educational toy includes a second switch, wherein the second switch is capable of causing the educational toy to move when the second switch is activated.

6. The educational toy of claim 1 further comprising means for causing the educational toy to sing.

7. The educational toy of claim 1 wherein different switches are associated with different colors.

8. The educational toy of claim 1 wherein each of the legs extends horizontally from a body portion.

9. The educational toy of claim 1 wherein each of the legs extends vertically from a body portion.

10. The education toy of claim 1 further comprising a plurality of illumination devices, wherein each of the illumination devices is associated with one of the plurality of switches.

11. The educational toy of claim 1 further comprising a plurality of light emitting diodes, wherein each of the light emitting diodes associated with one of the plurality of switches.

12. A caterpillar-shaped educational toy comprising:
    a series of body portions in the caterpillar-shaped educational toy;
    a series of switches, each of the switchs being associated with a body portion within the series of body portions;
    a set of indicia associated with the switches;
    a voice synthesizer operatively coupled to the switches; and
    a speaker operatively coupled to the voice synthesizer.

13. The caterpillar-shaped educational toy of claim 12 further comprising a series of appendages extending from the body portions in the series of body portions.

14. The caterpillar-shaped educational toy of claim 12 wherein the body portions are segmented body portions.

15. The caterpillar-shaped educational toy of claim 12 wherein the set of indicia is on the body portions.

16. The caterpillar-shaped educational toy of claim 12 further comprising two appendages coupled to each of the body portions.

17. The caterpillar-shaped educational toy of claim 12 wherein the educational toy is plush.

18. The caterpillar-shaped educational toy of claim 12 wherein each of the body portions has a concave shape.

19. The caterpillar-shaped educational toy of claim 12 wherein each of the switches is a pressure switch.

20. The caterpillar-shaped educational toy of claim 12 wherein each of the switches is a first switch, and wherein the educational toy includes a second switch, wherein the second switch is capable of causing the educational toy to move when the second switch is activated.

21. The caterpillar-shaped educational toy of claim 12 further comprising means for moving the caterpillar-shaped educational toy.

22. The caterpillar-shaped educational toy of claim 12 wherein the switches comprise pressure switches and wherein the educational toy further comprises means for causing the educational toy to move after a pressure switch is depressed.

23. The caterpillar-shaped educational toy of claim 12 further comprising means for causing the educational toy to sing.

24. The caterpillar-shaped educational toy of claim 12 wherein different switches are associated with different colors.

25. The caterpillar-shaped educational toy of claim 12 further comprising appendages extending horizontally from a body portion.

26. The caterpillar-shaped educational toy of claim 12 further comprising appendages extending vertically from a body portion.

27. The caterpillar-shaped educational toy of claim 12 wherein the educational toy is capable of playing music.

28. The caterpillar-shaped educational toy of claim 12 further comprising a plurality of illumination devices, wherein each of the illumination devices is associated with one of the plurality of switches.

29. The caterpillar-shaped educational toy of claim 12 further comprising a plurality of light emitting diodes, wherein each of the light emitting diodes is associated with one of the plurality of switches.

30. The caterpillar-shaped educational toy of claim 12 wherein each of the switches is a first switch, wherein each of the first switches is associated with a different color and comprises a pressure switch, and wherein the educational toy is capable of moving after an indicium is selected.

31. A caterpillar-shaped educational toy comprising:
    a series of body portions in the caterpillar-shaped educational toy;
    a series of appendages coupled to the body portions;
    a series of pressure switches, each of the appendages in the series of appendages comprising at least one of the pressure switches;
    a set of indicia, each indicium in the set of indicia being associated with an appendage in the series of appendages;
    a voice synthesizer operatively coupled to the series of pressure switches; and
    a speaker operatively coupled to the voice synthesizer,
    wherein the caterpillar-shaped educational toy is capable of automatically moving after one or more of the switches are activated.

32. The caterpillar-shaped toy of claim 31 wherein the caterpillar-shaped toy is capable of playing music.

33. The caterpillar-shaped toy of claim 31 wherein the caterpillar-shaped toy is plush.

34. The caterpillar-shaped toy of claim 31 wherein the appendages are legs.

35. The caterpillar-shaped toy of claim 31 wherein there are two appendages per body portion.

36. The caterpillar-shaped toy of claim 31 wherein the indicia comprise different colors.

37. An elongated insect toy comprising:
- a series of body portions in the elongated insect toy;
- a series of pressure switches, the series of pressure switches being in the elongated insect toy;
- a set of indicia associated with the series of pressure switches;
- a voice synthesizer operatively coupled to the series of pressure switches; and
- a speaker operatively coupled to the voice synthesizer.

38. The elongated insect toy of claim 37 wherein the set of indicia comprises a set of numbers.

39. The elongated insect toy of claim 37 wherein the set of indicia comprises a set of letters.

40. The elongated insect toy of claim 37 wherein indicia comprises a set of symbols.

41. The elongated insect toy of claim 37 wherein the set of indicia comprises different colors.

42. The elongated insect toy of claim 37 further comprising a plurality of illumination devices associated with the series of body portions.

43. The elongated insect toy of claim 37 further comprising means for playing songs.

44. The elongated insect toy of claim 37 further comprising means for causing the elongated insect toy to move.

45. The elongated insect toy of claim 37 wherein the set of indicia comprises the alphabet.

46. The elongated insect toy of claim 37 wherein the elongated insect toy is in the form of a caterpillar or a centipede.

47. The elongated insect toy of claim 37 wherein each of the body portions is associated with a single indicium.

48. The elongated insect toy of claim 37 wherein each indicium in the series of indicia is related to other indicia in the series of indicia.

49. The elongated insect toy of claim 37 further comprising a plurality of illumination devices associated with the series of body portions, and wherein the elongated insect is capable of playing music and is in the form of a caterpillar.

50. An educational toy comprising:
- a series of connected body segment portions;
- a series of legs attached to said body segment portions to form a caterpillar shape, each of said legs associated with a member of an ordered set of letters; and
- a voice synthesizer associated with said legs so that when one of said legs is pressed, said voice synthesizer vocalizes the pronunciation of one of the members of said ordered set of letters.

\* \* \* \* \*